Jan. 24, 1956  O. E. ECKHOFF  2,731,926
PIE MARKER
Filed May 18, 1953
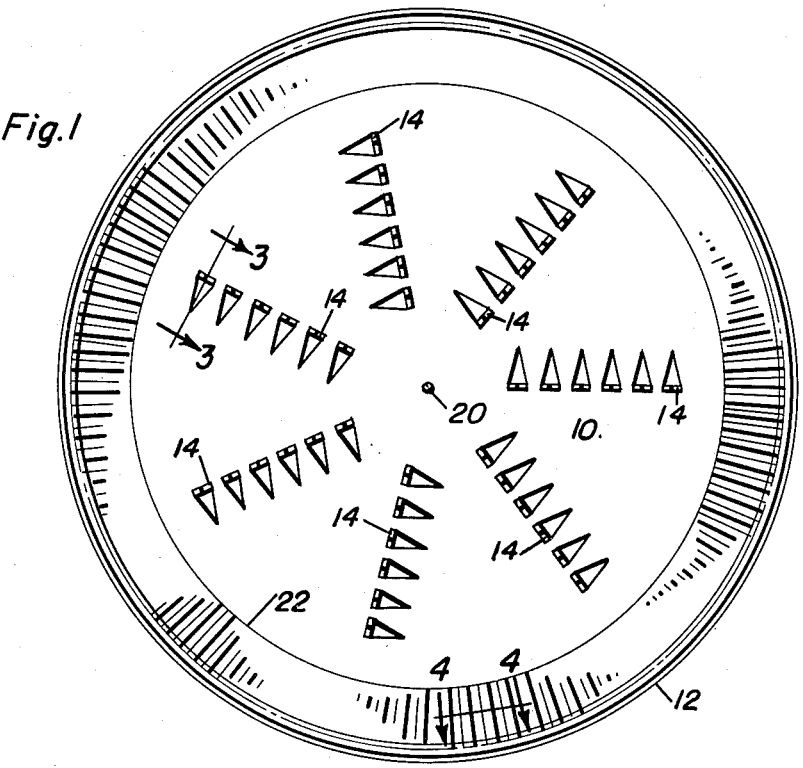
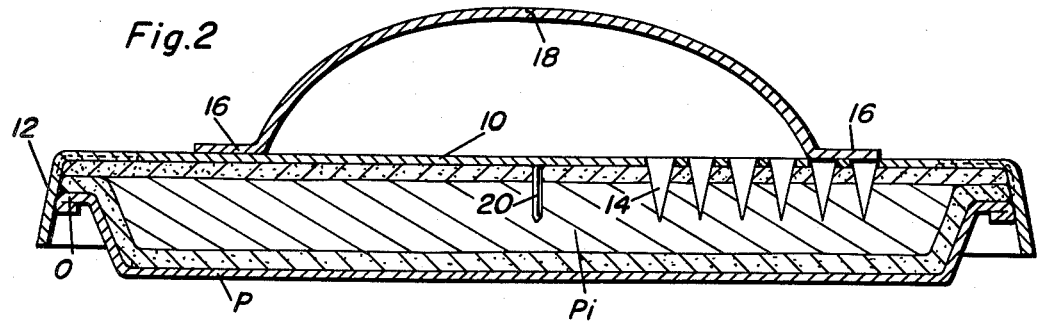
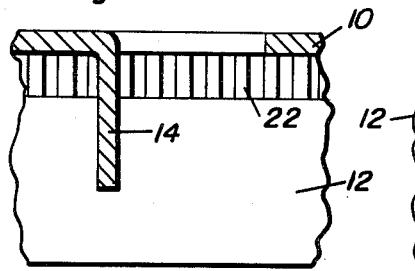
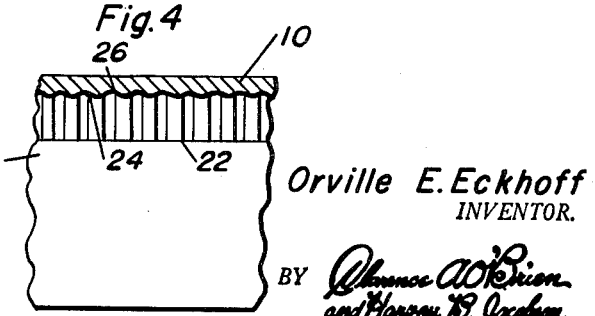
Orville E. Eckhoff
INVENTOR.

United States Patent Office 2,731,926
Patented Jan. 24, 1956

2,731,926
PIE MARKER
Orville E. Eckhoff, San Antonio, Tex.
Application May 18, 1953, Serial No. 355,630
1 Claim. (Cl. 107—49)

This invention relates to new and useful improvements in pie markers and the primary object of the present invention is to provide a device for marking a pie into radial areas to indicate where a blade is to be inserted for cutting the pie into slices.

Another important object of the present invention is to provide a pie marker having circumferentially spaced, radial rows of spaced teeth which are struck from a plate member to form ventilating or outlet openings in the plate member for the escape of air as the plate member is pressed downwardly over a pie.

A further object of the present invention is to provide a plate member having a depending peripheral flange and a series of circumferentially spaced ribs and grooves at its outer edge which extend to the flange for producing crimps in the edge of a pie crust that overlies the flange of a pie pan.

A still further aim of the present invention is to provide a pie marker that is simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a bottom plan view of the present invention;

Figure 2 is a vertical sectional view of the present invention and a pan containing a pie under the present invention;

Figure 3 is an enlarged detail sectional view taken substantially on the plane of the section line 3—3 of Figure 1; and Figure 4 is an enlarged detail sectional view taken substantially on the plane of section line 4—4 of Figure 1.

Referring now to the drawings in detail, wherein for the purpose of illustration, there is disclosed a preferred embodiment of the present invention, the numeral 10 represents an annular plate member having a depending peripheral flange or downwardly flared skirt 12 that will engage over the outwardly turned upper portion O of a pie pan P.

A plurality of circumferentially spaced radial rows of triangular marker teeth 14 are struck outwardly from the plate member 10 and project downwardly from the underside of the plate member at right angles thereto. Adjacent rows of teeth 14 are spaced apart an equal distance and adjacent teeth of each row are also spaced apart an equal distance as shown in Figure 1.

The outwardly turned ends 16 of a U-shaped hand grip 18 are fixed by suitable means to the upper surface of the plate member 10 and a pointed lug or pin 20 is fixed to the undersurface of the plate member 10 at the center thereof.

The outer portion of plate member, at its juncture with flange 12, is provided with a corrugated ring area 22 composed of alternate ribs 24 and grooves 26 that are disposed radially of the plate member. The outer ends of the ribs and grooves extend past the inner end of flange 12 into said flange transversely thereof as shown in Figures 3 and 4.

In practical use of the present invention, the plate member is placed over the pie Pi in a pan P and the member 10 is lowered with the teeth 14 and lug 20 penetrating the crust of the pie to leave marks, whereby a knife may be used for cutting the pie into slices.

As the teeth 14 are struck from the plate member 10 there will be openings formed in the plate member to permit the escape of air as the pie marker 10, 12 is slipped over the pie and pan, thereby facilitating convenient placing of the member 10 downwardly against the pie.

The corrugated area 22 will press the pie covering or crust against the flange portion O in order to crimp the covering and produce a neat design while forcing the pie covering against the dough sides of the pie.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

As a new article of manufacture, a pie marker comprising a plate member having a peripheral flange adapted to engage over the rim of a pie pan, a pie puncturing lug projecting downwardly from the center of the plate member, and circumferentially spaced radially disposed rows of spaced marker teeth carried by the plate member, said teeth being flat, pointed and triangular and being struck from said plate member to provide ventilating openings in the plate member, adjacent teeth of each row of teeth being spaced apart an equal distance.

References Cited in the file of this patent
UNITED STATES PATENTS

| | | |
|---|---|---|
| 881,077 | Hudson | Mar. 3, 1908 |
| 1,474,640 | Pinkosh | Nov. 20, 1923 |
| 1,519,752 | Bannister | Dec. 16, 1924 |
| 1,728,064 | Johnson | Sept. 10, 1929 |
| 1,834,718 | Lastomirsky | Dec. 1, 1931 |
| 2,495,553 | Shaw | Jan. 24, 1950 |